(12) United States Patent
Hogan et al.

(10) Patent No.: US 11,803,760 B1
(45) Date of Patent: Oct. 31, 2023

(54) METHOD AND SYSTEMS FOR COMBINING NEURAL NETWORKS WITH GENETIC OPTIMIZATION IN THE CONTEXT OF ELECTRONIC COMPONENT PLACEMENT

(71) Applicant: Cadence Design Systems, Inc., San Jose, CA (US)

(72) Inventors: Taylor Elsom Hogan, Boston, MA (US); Zachary Joseph Zumbo, Brookline, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 1,037 days.

(21) Appl. No.: 16/666,941

(22) Filed: Oct. 29, 2019

(51) Int. Cl.
*G06F 30/394* (2020.01)
*G06F 111/20* (2020.01)
*G06N 3/04* (2023.01)
*G06N 3/086* (2023.01)

(52) U.S. Cl.
CPC .............. *G06N 3/086* (2013.01); *G06F 30/394* (2020.01); *G06N 3/04* (2013.01); *G06F 2111/20* (2020.01)

(58) Field of Classification Search
USPC ........................................................ 716/126
See application file for complete search history.

(56) References Cited

U.S. PATENT DOCUMENTS

2004/0015803 A1* 1/2004 Huang et al. .......... G06F 30/39
716/103

* cited by examiner

*Primary Examiner* — Bryce M Aisaka
(74) *Attorney, Agent, or Firm* — Mark H. Whittenberger, Esq.; Holland & Knight LLP

(57) ABSTRACT

The present disclosure relates to applying genetic optimization to a routing strategy associated with an electronic design. Embodiments may include receiving pin and net information from an electronic design file and determining a minimum spanning tree for all pins associated with each net. Embodiments may include identifying pairs of connected pins and representing the pins as at least one line segment without layer information. Embodiments may include generating a crossing map based upon the line segments and assigning random layer information to each of the line segments. Embodiments may further include performing crossover and mutation operations to the line segments using hyperparameters and evaluating a fitness of the line segments. Embodiments may also include instantiating vias based upon a layer to which the line segment was assigned.

20 Claims, 8 Drawing Sheets

| Genetic Optimization for Via Placement |
|---|
| Result: Optimal via / layer placement strategy<br>$population = genPopulation();$<br>$crossing\_map = genCrossingMap(population[0]);$<br>for $gen \leftarrow 0$ to $ngen$ do<br>    if $stop\_condition$ then<br>        $break;$<br>    else<br>        $population.tournament\_select();$<br>        $population.crossover();$<br>        $population.mutate();$<br>        $population.eval\_fitness();$<br>    end<br>end<br>$best = population.select\_best();$ |

FIG. 5

| Pin Pair | Crossings (2D) |
|---|---|
| P1 | {P2, P3, P4, P5} |
| P2 | {P3, P4, P5} |
| P3 | {} |
| P4 | {} |
| P5 | {} |

| Pin Pair | Layer |
|---|---|
| P1 | 1 |
| P2 | 1 |
| P3 | 0 |
| P4 | 0 |
| P5 | 0 |

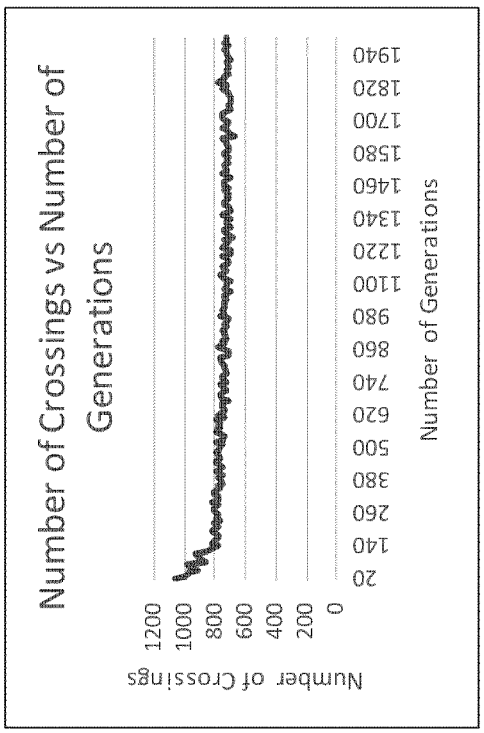
FIG. 8A
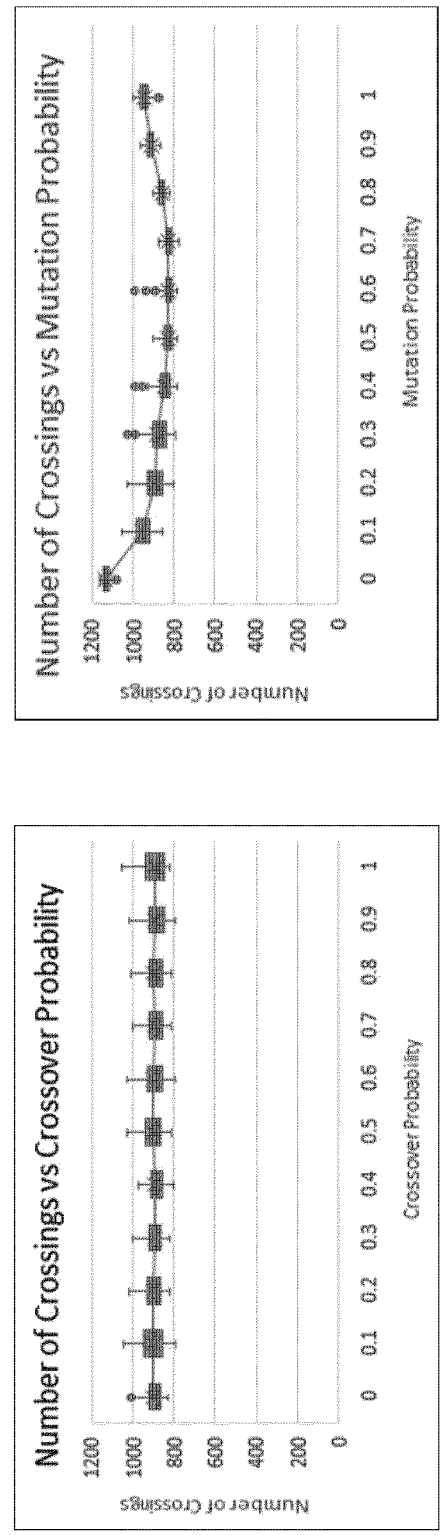
FIG. 8B
FIG. 8C

US 11,803,760 B1

METHOD AND SYSTEMS FOR COMBINING NEURAL NETWORKS WITH GENETIC OPTIMIZATION IN THE CONTEXT OF ELECTRONIC COMPONENT PLACEMENT

FIELD OF THE INVENTION

The present disclosure relates to genetic optimization, and more specifically, to genetic optimization applied to via and route strategy.

DISCUSSION OF THE RELATED ART

The concept of via placement is not new in the field of Electronic Design Automation (EDA). PCB designers were tasked with routing traces and placing vias on multiple layers as far back as the late 1940s when the first double-sided PCB was produced. A vertical interconnect access, otherwise known as a via, was necessary to ensure electrical connectivity between multiple layers. Originally punched through the PCB in 'plated through hole' fashion, vias were used to connect through-hole components to a board with solder. Today, vias come in multiple types, including through-hole, blind, and buried types. These are primarily designed to route traces from one layer to any other rather than mount components, as most modern components are mounted using Surface Mount Technology (SMT). Even on relatively simple designs, packages and boards incorporate hundreds to thousands of vias to route connections.

As multi-layer PCBs have become increasingly common and as EDA tools have necessarily become more aware of complex designs, the problem of routing under stricter conditions has pivoted. Engineers must be aware of more specific design considerations such as signal and power integrity, EMI issues, high speed constraints, low latency, cost, etc. while EDA software must also understand these multi-faceted and often related issues. Historically, PCB design engineers have decried automatic placement and routing tools as unprofessional, often faulty, and a crutch for those without industry knowledge.

SUMMARY

In an implementation, a computer-implemented method for applying genetic optimization to a routing strategy associated with an electronic design is provided. The method may include receiving pin and net information from an electronic design file and determining a minimum spanning tree for all pins associated with each net. The method may include identifying pairs of connected pins and representing the pins as at least one line segment without layer information. The method may include generating a crossing map based upon the line segments and assigning random layer information to each of the line segments. The method may further include performing crossover and mutation operations to the line segments using hyperparameters and evaluating a fitness of the line segments. The method may also include instantiating vias based upon a layer to which the line segment was assigned.

One or more of the following features may be included. In some embodiments the fitness may be based upon, at least in part, a number of crossings of the at least one line segment and/or a distribution of crossings of the at least one line segment. The distribution of crossings may be based upon, at least in part, a uniformity metric associated with the distribution of crossings of the at least one line segment. The method may include selecting one or more best individual line segments from the at least one line segment based upon, at least in part, a tournament-based approach. The method may also include exporting resultant pin and layer data to an electronic design application. Instantiating one or more vias may include instantiating the one or more vias in a position under one or more pins. The method may include displaying a logical trace between a first pin and a second pin. The method may further include displaying a differential pair as a single logical trace. The fitness may be based upon, at least in part, one or more of a neural network, a heatmap, or rectangular uniform wire density ("RUDY"). Generating a crossing map may include pre-computing one or more crossings.

In another implementation, a computer-readable storage medium having stored thereon instructions for applying genetic optimization to a routing strategy associated with an electronic design is provided. Operations may include receiving pin and net information from an electronic design file and determining a minimum spanning tree for all pins associated with each net. Operations may include identifying pairs of connected pins and representing the pins as at least one line segment without layer information. Operations may include generating a crossing map based upon the line segments and assigning random layer information to each of the line segments. Operations may further include performing crossover and mutation operations to the line segments using hyperparameters and evaluating a fitness of the line segments. Operations may also include instantiating vias based upon a layer to which the line segment was assigned.

One or more of the following features may be included. In some embodiments the fitness may be based upon, at least in part, a number of crossings of the at least one line segment and/or a distribution of crossings of the at least one line segment. The distribution of crossings may be based upon, at least in part, a uniformity metric associated with the distribution of crossings of the at least one line segment. Operations may include selecting one or more best individual line segments from the at least one line segment based upon, at least in part, a tournament-based approach. Operations may also include exporting resultant pin and layer data to an electronic design application. Instantiating one or more vias may include instantiating the one or more vias in a position under one or more pins. Operations may include displaying a logical trace between a first pin and a second pin. Operations may further include displaying a differential pair as a single logical trace. The fitness may be based upon, at least in part, one or more of a neural network, a heatmap, or rectangular uniform wire density ("RUDY"). Generating a crossing map may include pre-computing one or more crossings.

In yet another embodiment, a system for applying genetic optimization to a routing strategy associated with an electronic design is provided. The system may include a processor configured to access pin and net information from an electronic design file. The processor may be further configured to determine a minimum spanning tree for all pins associated with each of one or more nets and to identify one or more pairs of connected pins. The processor may be further configured to represent the one or more pins as at least one line segment without layer information. The processor may be further configured to generate a crossing map based upon, at least in part, the at least one line segment and to assign random layer information to each of the at least one line segment. The processor may be further configured to perform crossover and mutation operations to the at least one line segment using one or more hyperparameters and to evaluate a fitness of the at least one line segment. The processor may be further configured to instantiate one or more vias based upon, at least in part, a layer to which the at least one line segment was assigned.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 5 is a diagram depicting examples of pseudocode in accordance with an embodiment of the present disclosure;

FIGS. 8A-C are graphic depictions of test results in accordance with an embodiment of the present disclosure.

DETAILED DESCRIPTION

Figure 1:
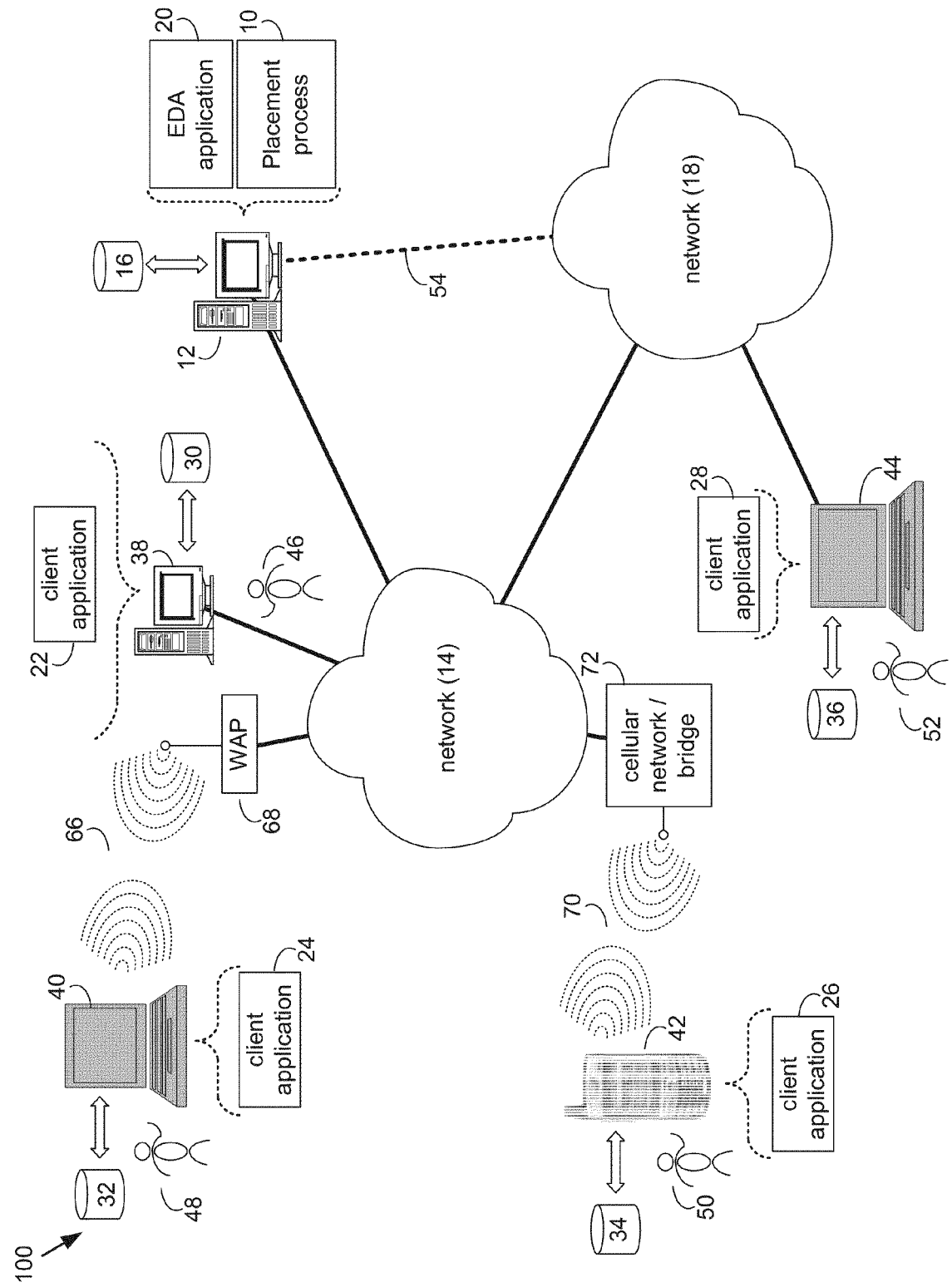
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Currently, EDA tools are still not well equipped to understand how component placement informs via placement, and consequently how via placement informs routing. However, improving each stage independently and providing a tool the ability to feedback design information with machine learning techniques would significantly increase the efficiency of design workflow. Ideally, whole designs would be synthesized with minimal human interaction in hours rather than weeks or months. This has widespread implications in the production of military and consumer electronics and could potentially change the timescales for product releases from quarters/years to weeks/months.

The via problem at its core is NP-Hard given that it requires super-polynomial time to enumerate the possible solutions and/or verify correctness using a deterministic algorithm. As a result, some embodiments included herein may be non-deterministic, i.e. pseudorandom in some internal process. Many pseudorandom and non-gradient based approaches have fast convergence times, and even though many of such algorithms find local rather than global minima, local minima are often sufficient.

With the rise in complexity and increased demand of consumer and industrial electronics, EDA tools and engineers have been stressed to their limits to produce quality designs on shorter and shorter timescales. To meet this increased demand and design expectations, engineers have been tasked to develop models to automate PCB placement and routing procedures using machine learning and artificial intelligence techniques. In the field of PCB routing, many subtasks have characteristics suitable for AI/ML optimization techniques due to the size of the design space / dimensionality of the problem. These approaches are particularly useful when a local optimal solution is acceptable, rather than a global optimal solution. Via placement is a crucial routing problem to be solved and integrated into EDA applications or platforms.

Accordingly, embodiments included herein are directed towards a genetic algorithm-based strategy and placement process that achieves fast convergence and has the ability to perform without training. In some embodiments, an approach was determined to produce an optimal via strategy given a set of flylines (e.g., pin pairs) using a genetic optimization library called Distributed Evolutionary Algorithms in Python ("DEAP"). The phrase placement process, as used herein, may refer to this genetic optimization approach to via strategy.

Referring to FIG. 1, there is shown a placement process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft®Windows® Server; Novell®NetWare®; or Red Hat®Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally / alternatively, placement process 10 may reside on and be executed, in whole or in part, by a client electronic device, such as a personal computer, notebook computer, personal digital assistant, or the like.

The instruction sets and subroutines of the placement process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example. It should be noted that any or all of the operations associated with placement process 10 may occur, either in whole or in part, in the cloud as part of a cloud computing architecture.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Placement process 10 may be a stand alone application, or may be an applet / application / script that may interact with and/or be executed within EDA application 20. In addition / as an alternative to being a server-side process, the placement process may be a client-side process (not shown) that may reside on a client electronic device (described below) and may interact with an EDA client application (e.g., one or more of EDA client applications 22, 24, 26, 28). Further, the placement process may be a hybrid server-side / client-side process that may interact with EDA application 20 and an EDA client application (e.g., one or more of client applications 22, 24, 26, 28). As such, the processes may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize placement process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54. Some or all of the operations discussed herein with regard to placement process 10 may be performed, in whole or in part, in the cloud as a cloud-based process including, for example, networks 14, 18 and any others.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11 g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network / bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
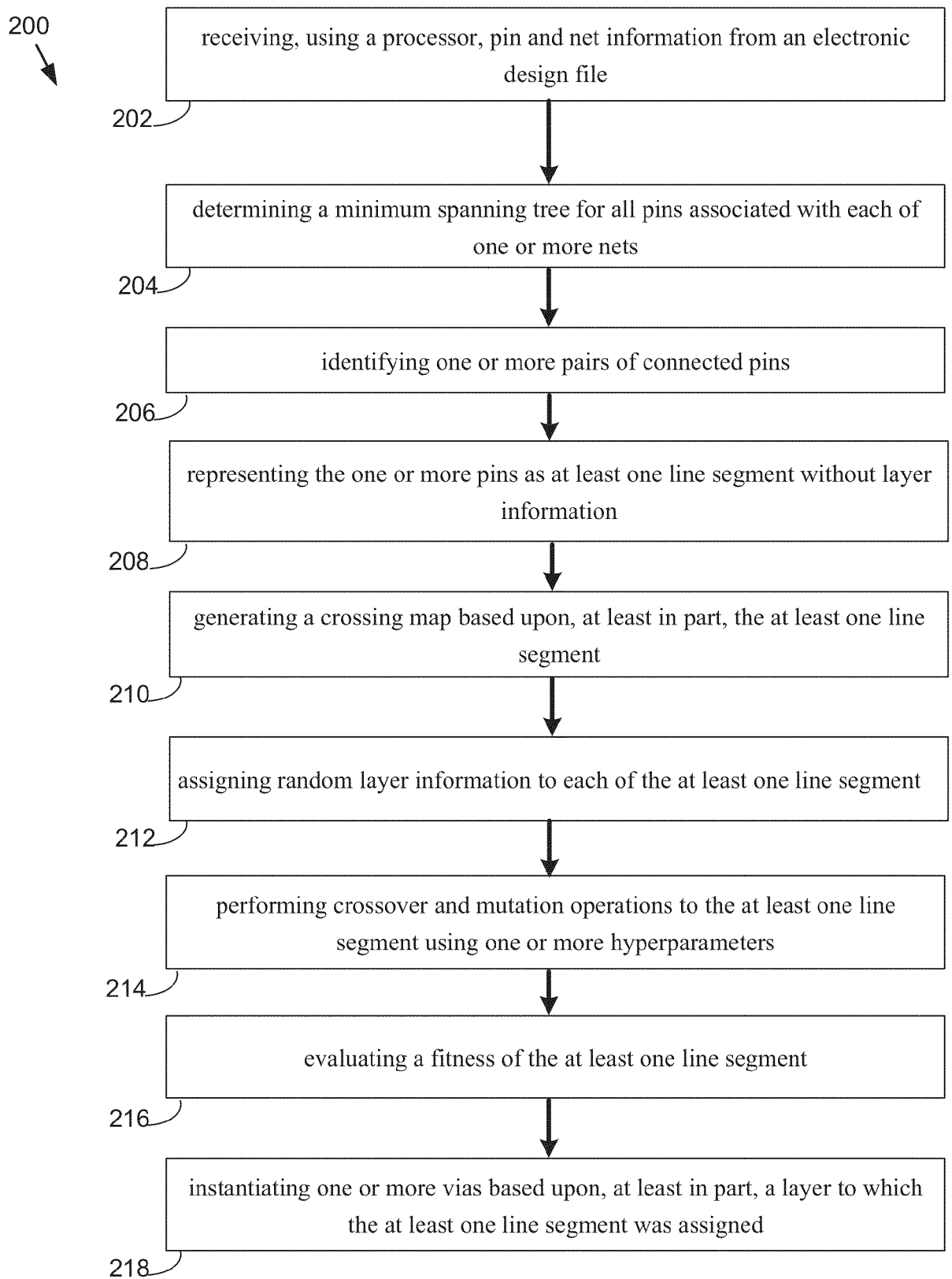
FIG. 2 is a flowchart depicting operations consistent with the placement process in accordance with an embodiment of the present disclosure.

Referring now to FIG. 2, an example flowchart depicting operations consistent with an embodiment of placement process 10 is provided. Placement process 10 may apply genetic optimization to a routing strategy associated with an electronic design. The process may include receiving (202), using a processor, pin and net information from an electronic design file and determining (204) a minimum spanning tree for all pins associated with each of one or more nets. The process may include identifying (206) one or more pairs of connected pins and representing (208) the one or more pins as at least one line segment without layer information. The process may include generating (210) a crossing map based upon, at least in part, the at least one line segment and assigning (212) random layer information to each of the at least one line segment. The process may include performing (214) crossover and mutation operations to the at least one line segment using one or more hyperparameters and evaluating (216) a fitness of the at least one line segment. The process may also include instantiating (218) one or more vias based upon, at least in part, a layer to which the at least one line segment was assigned. Numerous other operations are also within the scope of the present disclosure.

In some embodiments, placement process 10 aims to solve issues surrounding determining via placement and route strategy during the routing stage, as current methods are inefficient, slow, greedy, and sequential. Additionally, early routes may block later ones. Accordingly, embodiments included herein may be used to precompute the location and layer target of vias, globally route, use flyline crossings on each layer as a metric for congestion, and reduce congestion by mutating route layers.

Conventional approaches apply via placement during routing, or not at all. Some routers will route until no new route is possible; then switch to a new layer. The conventional automatic placement approaches today are static and make no use of past experiences with similar designs to optimize current designs. Until recently, hardware did not exist to efficiently allow this learning. These conventional approaches are slow, inefficient, and often do not find a solution. In contrast, embodiments of placement process 10 may be configured to precompute route layers using a crossing metric, and allows layer routing independently (e.g., parallel).

Figure 3:
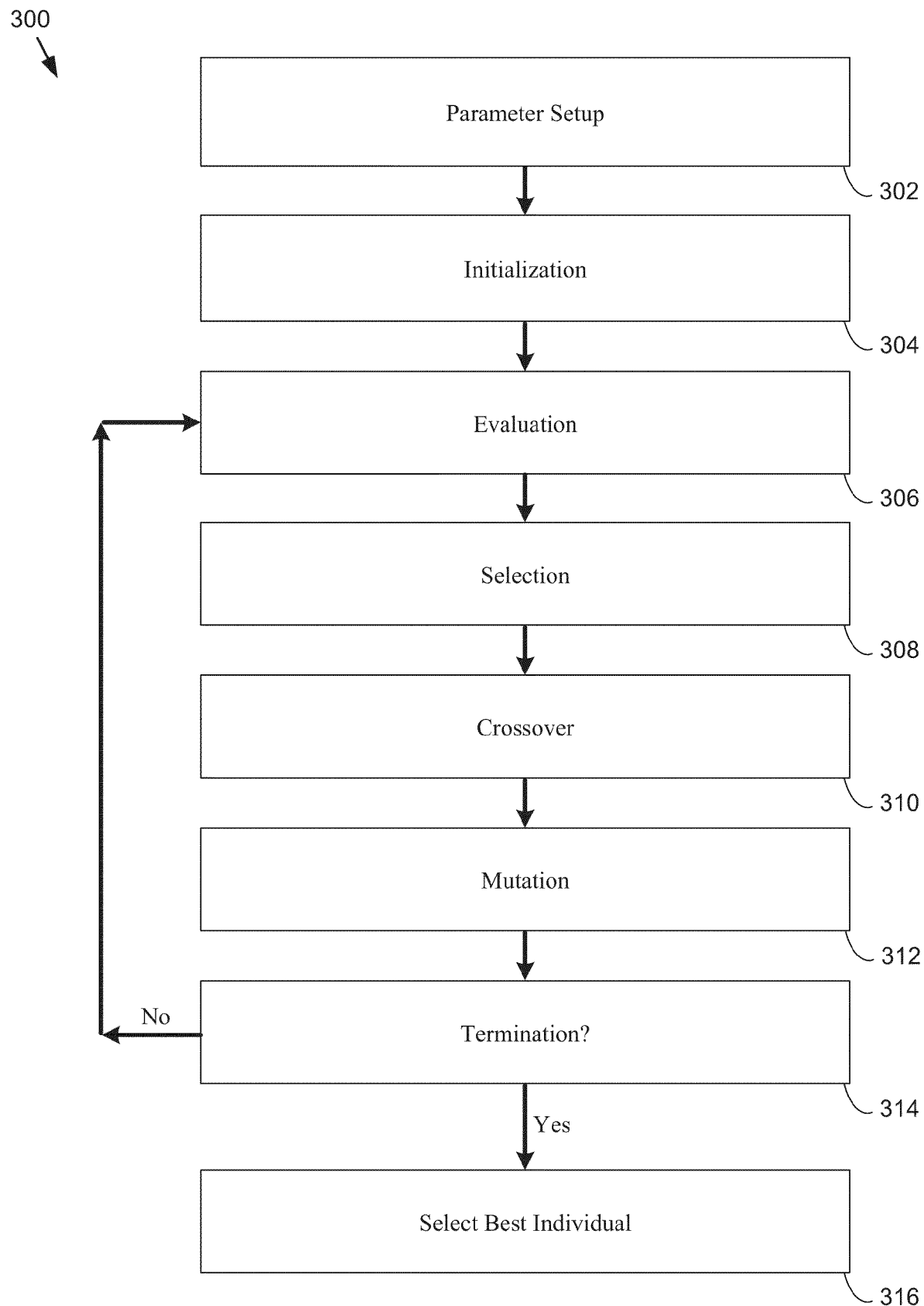
FIG. 3 is a flowchart depicting operations consistent with the placement process in accordance with an embodiment of the present disclosure.
Figure 4:
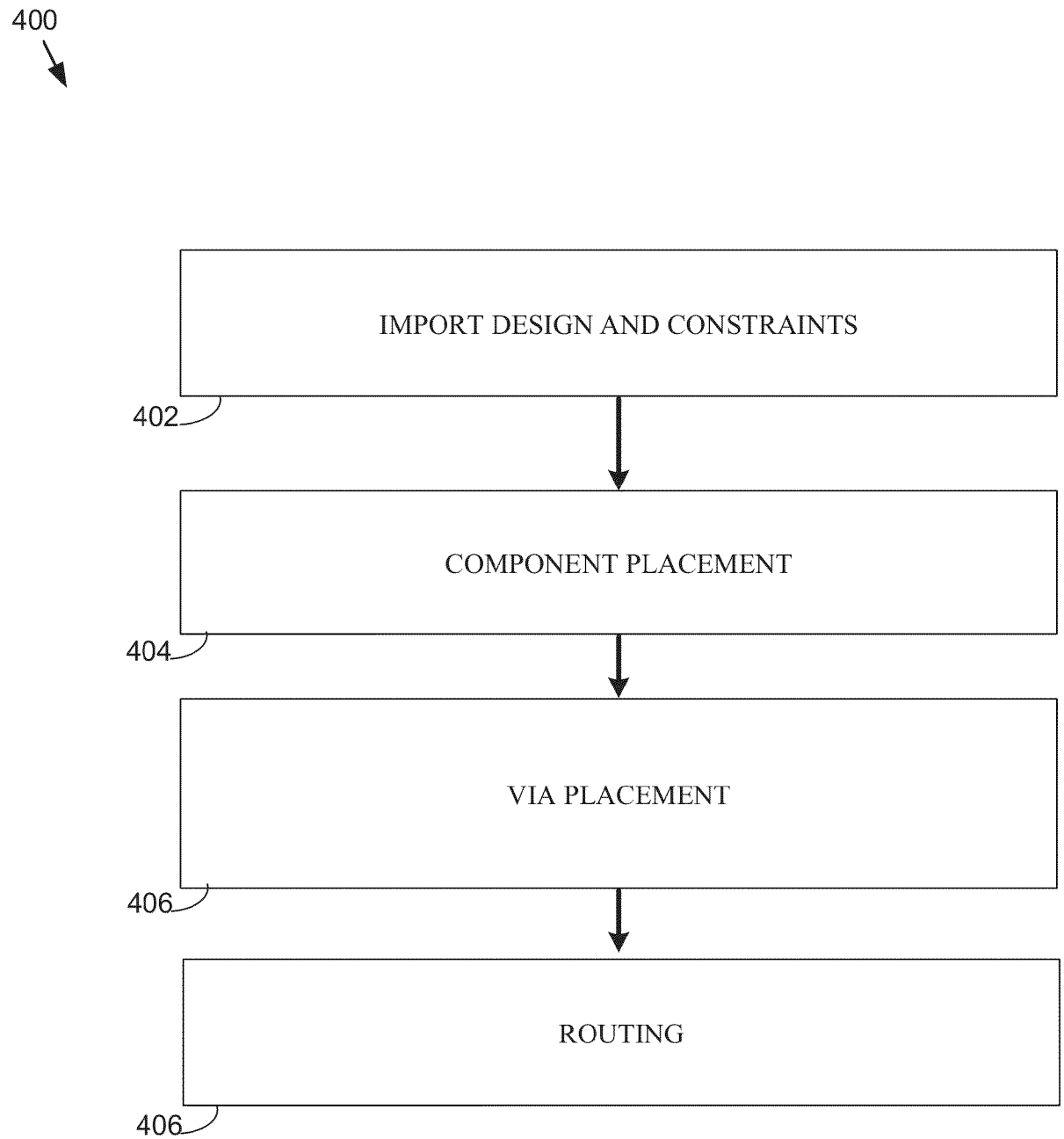
FIG. 4 is a flowchart depicting operations consistent with the placement process in accordance with an embodiment of the present disclosure.

Referring now to FIGS. 3-5, embodiments of placement process 10 are provided. Embodiments included herein may assume a via under a pin, make an informed decision ahead of time, and look more "human". Furthermore, embodiments of placement process 10 may be more easily altered if auto-routing fails. Placement process 10 may be potentially parallelizable, global, and may allow for independent layer routing. Embodiments included herein may have an interchangeable metric for congestion such as flyline/rat crossings and rectangular uniform wire density ("RUDY") and may be faster than other approaches, more proactive, and more flexible because it can use different metrics.

The teachings of the present disclosure may be used to decrease design synthesis time, and to produce faster design testing. However, final integration and optimization for large designs are still challenges. Other applications include genetic optimization applied to placement, new metrics, and design space exploration.

Referring again to FIG. 3, a flowchart 300 consistent with embodiments of placement process 10 is provided. In some embodiments, placement process 10 may include parameter setup 302. At this stage, the mutation rate, crossover rate, number of generations or seconds, populations size, and number of cores may be set. Initialization stage 304 may be used to randomize an initial population, giving each connection a random layer. At evaluation stage 306, the process may calculate the fitness of all individuals based on a congestion metric (e.g. number of crossings, RUDY, neural network, etc.). At selection stage 308, the best individuals may be selected using a tournament based approach. Crossover stage 310 may be used to perform a two point crossover between individuals prior to mutating layer information at mutation stage 312. A determination may be made at termination stage 312 as to whether enough time has passed, desired fitness achieved, or whether a maximum number of generations has been reached. The best design may be selected at selection stage 314 and the results may be exported to EDA application 20.

Genetic optimization is known for its use in optimization problems. Neural networks naturally employ learned information to predict future events. When placing a plurality of devices on an electronic interconnect (routing) can be achieved. However, routing each potential configuration found by genetic optimization is prohibitively expensive. Past configurations can be routed and feature extraction of the design can be used to train a neural net. Features such as layer count, device types, power planes, all play a role in determining appropriate device to device geometric relationships. The trained neural net may then be used in real time to guide the genetic optimizations. By allowing the system to "play itself" in the background, a neural net can be deeply trained to give good predictions of appropriate device to device clearances. In this way, placement process 10 may be configured to use one or more neural nets to guide a genetic optimization. Additionally, embodiments of placement process 10 may also provide the ability to continuously use genetic optimization to train the neural network.

In some embodiments, automatic placement may be performed using a statistical (genetic) optimization process. These algorithms may require a score to be found for each design. Accordingly, a design may be scored by a previously trained neural net. Normal automatic placement uses a static set of constraints provided by the user. Placement process 10 may be configured to allow a neural net to guide the placement and, as such, previous designs may be used to train the net. Thus, past experiences may influence future placements. By allowing the placement algorithm to "self-play", these experiences can be learned in the background.

Current algorithms do not use past designs to score new designs. Therefore, embodiments included herein will have better results, may be trained on specific customer design styles, and placement quality and time are enhanced by adding hardware.

Embodiments of placement process 10 may provide a new level of abstraction to exploit, to reduce the local density of traces on a design, and to allow auto-routing functionality. In some embodiments, placement process 10 may be configured to circumvent the auto-router's relatively weak ability to place vias by essentially precomputing via layers and locations. The main issue with auto-routing in a typical setting is that traces are laid out in a greedy fashion, often unnecessarily congesting areas of the board and compounding routing issues that could have been solved with a bit of preparation and organization. Vias tend to be placed haphazardly to escape areas of the board that could have been planned around. By instead placing vias first, embodiments of placement process 10 may restrict the search space of the routing algorithm by requiring a specific layer to route on.

In some embodiments, placement process 10 may address how to effectively predict ahead of time which layers each trace primarily belongs. In some embodiments, placement process 10 may be configured to use flylines, or pin pairs, as a proxy for trace information. The straight-line path between two pins is generally a suitable heuristic for the final path a trace will be routed in the future, especially since the routing search algorithms commonly use the Euclidean distance to the goal as a live heuristic. In some embodiments, the number of crossings of these flylines on each layer and/or the total crossing distribution across layers may be used as metrics for the ability to route a design. By using flyline crossings as a substitute for trace density, embodiments included herein may lower the dimensionality of the search space while simultaneously decreasing the total time needed to complete a design.

In some embodiments, the final objective is for placement process 10 may be to act as a link between the placement and routing operations, thus making the end-to-end automatic placement to route process feasible. Ultimately the success of the routing stage is dependent the results of placement process 10, meaning if placement process 10 provides an effective enough solution then the automatic router should be able to fully complete a design. On the other hand, since placement process 10 may operate as a façade for layer assignment, there is no guarantee that the translation from placement process 10 to the auto-router will be a successful one. The algorithm's process, the assumptions made, and their associated shortcomings are discussed in further detail below.

In some embodiments, and as shown in FIG. 4, a design planner or EDA application 20 (such as those available from the Assignee of the present disclosure) may first import a design file containing the physical connectivity information, including, but not limited to, the net list, each component's layout, metadata, etc. EDA application 20 may then automatically place the components using a heuristic to minimize copper usage (e.g., the total length of traces). This placement information may then exported into a format (e.g., JSON) so that placement process 10 may interpret the location of each component's pin. From there, the operations discussed below may occur using Python or any suitable technique.

In some embodiments, placement process 10 may be configured to read pin and net information from an exported file (e.g., JSON). The process may then run one or more algorithms (e.g., Prim's algorithm, etc.) to find the minimum spanning tree for all pins on same net. This may be repeated for all nets. The process may then collect pairs of connected pins and represent them as flylines / line segments without layer information.

In some embodiments, placement process 10 may then re-compute the intersection of all line segments as if all flylines were on the same layer. This may be referred to as the crossing map (key: single flyline, value: all flylines that intersect the keyed flyline). Since the geometry of the lines do not change during the optimization process, the crossings can be precomputed, thus saving time during optimization. In some embodiments, the storage mechanism may be a map from a single flyline to all other flylines that it crosses. Maps may include both a key and a value. For a given key there is a unique value. The key in the case is a single flyline. The value is the collection of all flylines that cross the key flyline.

In some embodiments, placement process 10 may then randomize an initial population of individuals (e.g., assigns random layer info to each flyline) and then crossover and mutate the individuals using the given hyperparameters. A "hyperparameter", as used herein, may refer to a parameter of the model that is set prior to optimization. It is not learned, but rather defined by the user. Examples of Genetic Optimization hyperparameters may include, but are not limited to, the number of individuals in a population, the probability of a mutation vs crossover, and/or the algorithm used to select the next generation, etc.

In some embodiments, placement process 10 may then evaluate the fitness of every individual based on one or more metrics. Some of these may include, but are not limited to, the number of crossings of flylines (want to minimize), the distribution of crossings (want to uniformly spread crossings), etc.

In some embodiments, and as shown in FIG. 5, placement process 10 may be configured to select the best individuals using a tournament-based approach. In operation, placement process 10 may repeat some or all of the above operations until desired fitness is achieved, or until time expires. Any pin and layer data may be exported to EDA application 20. It should be noted that the pseudocode provided in FIG. 5 is provided merely by way of example and is merely one possible example consistent with embodiments of placement process 10. Numerous variations, additions, and alterations are also within the scope of the present disclosure.

In some embodiments, once EDA application 20 receives the exported information from placement process 10, EDA application 20 may instantiate one or more of the vias in the system design according to the layer each flyline was assigned. For example, assume flyline_1 represents pins P1 and P2. P1 and P2 belong to different components on the TOP layer. Placement process 10 may calculate that flyline_1 should belong to the BOTTOM layer, thus EDA application 20 may create a via under P1 from TOP to BOTTOM, and another via under P2 from BOTTOM to TOP. This process may only place vias directly under pins, as is discussed in further detail below.

In some embodiments, placement process 10 has been formulated under three main assumptions to make the design and implementation easier, the first being a via-under-pin implementation. Because via placement is typically defined by both a position and a set of layers, the time-complexity of the full problem is on the order of component placement, if not worse. Thus, for simplification purposes, some embodiments of placement process 10 may only place vias directly under pins, therefore reducing the degrees of freedom to a single discrete domain (e.g., the layer to place a trace on). This allows the genetic fitness evaluation function to run quickly for an entire generation (e.g., milliseconds) as opposed to a full route (e.g., minutes / hours).

In some embodiments, since vias are placed directly on top of pins, traces may be viewed logically as a straight line from pin to pin. These logical traces, known as flylines or rats, are the minimum spanning tree representation that connect all pins on the same net. These flylines also have zero width, meaning the thickness of a wire may not be considered. By viewing the traces as line segments in a 2D space, embodiments included herein may reduce time-complexity by trading off for model simplicity.

In some embodiments, differential pairs may be assumed to be single traces in this model, which is a close approximation since most diff pairs travel relatively close to each other and terminate at similar locations.

Since flylines are only a proxy for the density of a design, there is not a guarantee that having a perfect or near-perfect via solution (e.g., one with no crossings or few crossings) implies the ability to fully route a design. Also, having a poor via solution also does not necessarily imply a design cannot be routed. The first case may occur if traces are wide, or if components prevent the placements of traces. The second could occur if there were components arranged in a wheel and spoke pattern. Traces can realistically navigate around the outside of the components, but the simplified model would show many crossings.

Pin escape and ball grid array ("BGA") fanout may be implemented as part of placement process 10. When fully integrated with EDA application 20, BGAs could be preprocessed to produce escaped pins that could be passed to placement process 10.

Differential pair routing can be difficult near endpoints since both diff pair traces are constrained to be the same length. Often when finishing routing, one of the two traces in the diff pair needs to be elongated to match the longer. This results in congestion near the pin, reducing the ability of a complete route.

Given these drawbacks, it can still be shown from our preliminary findings that the simplifying assumptions are a suitable trade-off for fast algorithmic performance and ultimately for fully routing a design.

Embodiments of placement process 10 provide great improvements over current auto-routing capabilities by introducing a via strategy component to the design process. Previously, even simple designs could not be routed, usually due to congestion that occurs in the last 5 to 10 percent of the routing procedure. Now, using placement process 10 has allowed for multiple successful automated design runs on simple PCBs as well as more complex interposer designs. Even with 5 minutes of evolution time using placement process 10 has shown major improvements over typical automatic routing schemes.

In some embodiments, by pre-computing flyline intersections, the running time for large designs may be reduced from hours to minutes. In some embodiments, a deep neural net may be trained on the same design data that was passed through placement process 10. Once implemented, the internal fitness function of placement process 10 may be replaced with this deep net, greatly decreasing the time needed to do evaluation, and eliminating the pre-computing stage altogether.

In some embodiments, various machine learning techniques may be employed. For instance, when routing, much information is currently lost after failed designs that could be used to inform successful future designs. Data such as local trace density, route completion percentage, via strategy and much more could be fed back to the initial design stage to push the algorithm towards an optimal solution.

Previous attempts at solving auto-routing's failure to produce complete designs have not made significant forward progress. Instead of focusing on improving the routing algorithm, embodiments of placement process 10 may abstract the idea to one or more stages, for example, component placement, layer placement, and trace routing.

Figure 6:
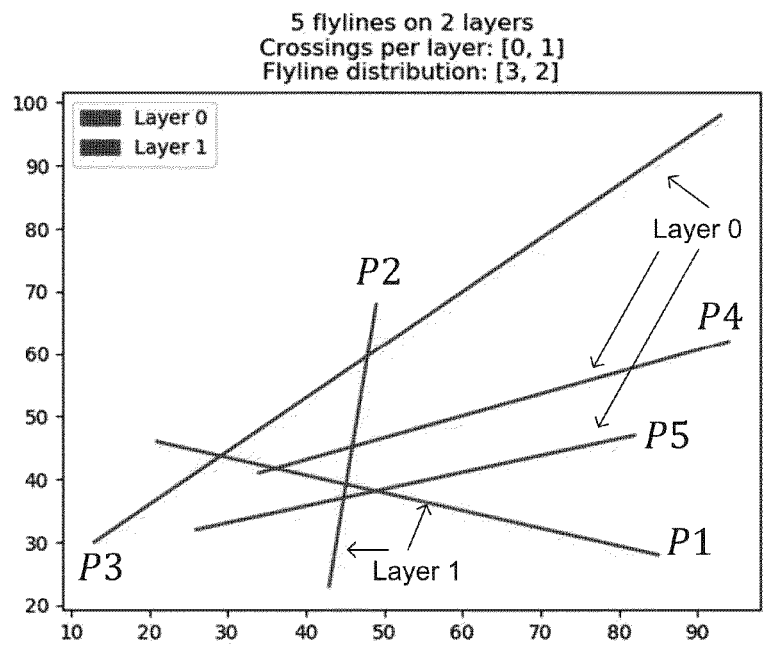
FIG. 6 is a graphic depiction of crossings per layer and flyline distribution in accordance with an embodiment of the present disclosure.

Referring now to FIG. 6, an example showing a graphical depiction of crossings per layer and flyline distribution is provided. After a design is imported, the crossing map may be generated. This keeps track of the pin-pairs that would cross if the board only had one layer, as such, the total number of crossings may be determined subsequently. This map does not double-count (e.g., P1 crosses P2, but this crossing is only counted once under P1). The population of chromosomes may then be generated. Each chromosome may represent the pin-pair layer assignment. On each iteration of placement process 10, chromosomes may be mutated, mated, and evaluated for fitness based on crossings. Placement process 10 run until a specified time has elapsed, or until a halt condition is met (e.g. < 10 crossings per layer).

Figure 7:
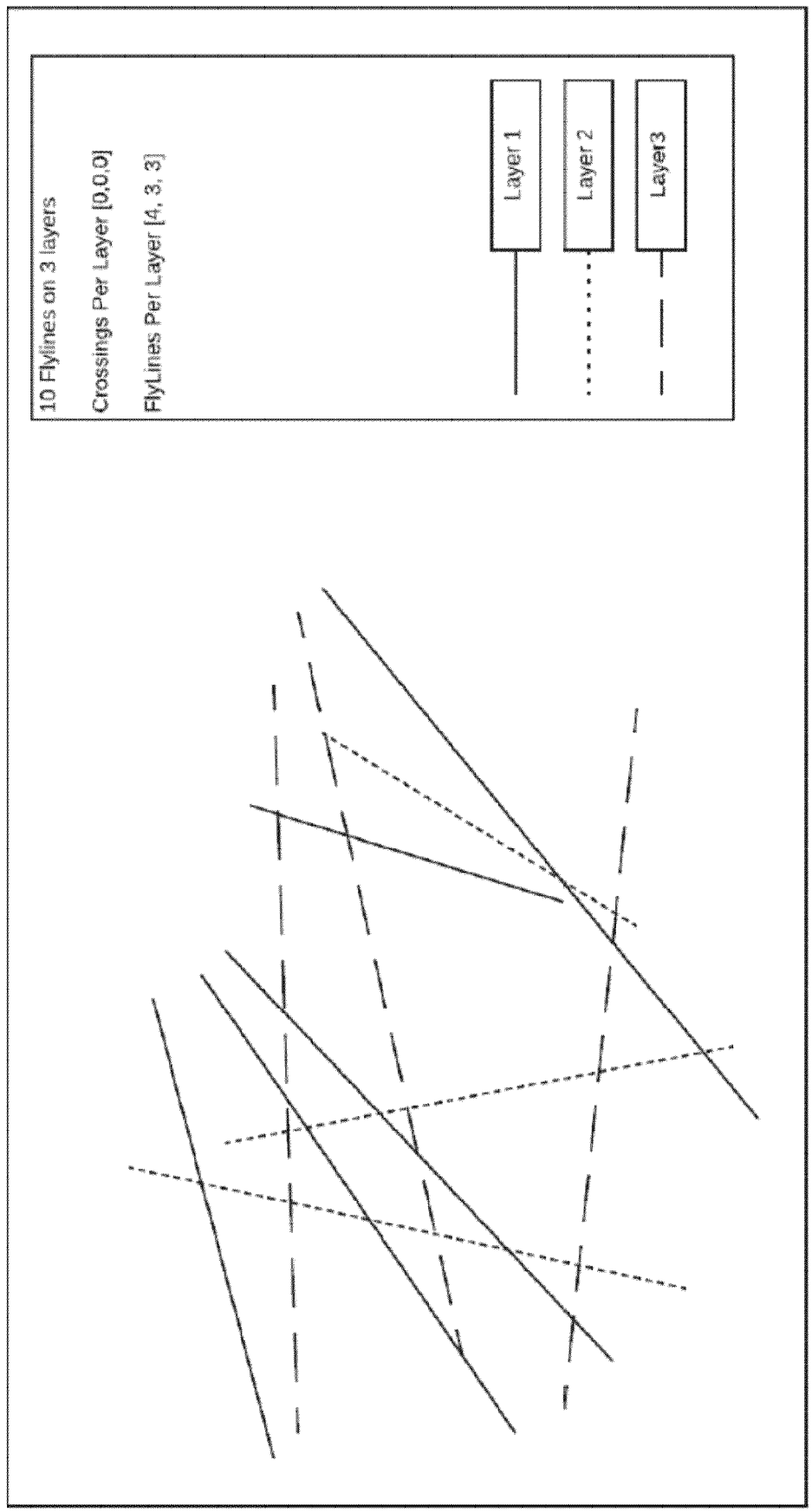
FIG. 7 is a graphic depiction of crossings per layer and flyline distribution in accordance with an embodiment of the present disclosure.

Referring now to FIG. 7, another example showing a graphical depiction of crossings per layer and flyline distribution is provided. The graph shows randomized flyline locations and zero crossings on each layer.

Referring now to FIGS. 8A-C, another example showing a graphical depiction of test results are provided. An array of initialization parameters were analyzed to determine the lowest number of crossings and fastest convergence.

It should be noted that although certain embodiments included herein may reference machine learning or genetic algorithms, any analysis process may be used in accordance with the teachings of the present disclosure. For example, any evolutionary algorithm, genetic algorithm, genetic program, grouping genetic algorithm, evolutionary computing approach, metaheuristics, stochastic optimization, optimization approach, artificial intelligence technique, etc. may be used without departing from the teachings of the present disclosure.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for applying genetic optimization to a routing strategy associated with an electronic design comprising:
   receiving, using a processor, pin and net information from an electronic design file;
   determining a minimum spanning tree for all pins associated with each of one or more nets;
   identifying one or more pairs of connected pins;
   representing the one or more pairs of connected pins as at least one line segment without layer information;
   generating a crossing map based upon, at least in part, the at least one line segment;
   assigning random layer information to each of the at least one line segment;
   performing crossover and mutation operations to the at least one line segment using one or more hyperparameters;
   evaluating a fitness of the at least one line segment; and
   instantiating one or more vias based upon, at least in part, a layer to which the at least one line segment was assigned.

2. The computer implemented method of claim 1, wherein the fitness is based upon, at least in part, a number of crossings of the at least one line segment.

3. The computer implemented method of claim 1, wherein the fitness is based upon, at least in part, a distribution of crossings of the at least one line segment.

4. The computer implemented method of claim 3, wherein the distribution of crossings is based upon, at least in part, a uniformity metric associated with the distribution of crossings of the at least one line segment.

5. The computer implemented method of claim 4 further comprising:
   selecting one or more best individual line segments from the at least one line segment based upon, at least in part, a tournament-based approach.

6. The computer implemented method of claim 4 further comprising:
   exporting resultant pin and layer data to an electronic design application.

7. The computer implemented method of claim 1, wherein instantiating one or more vias includes instantiating the one or more vias in a position under one or more pins.

8. The computer implemented method of claim 7, further comprising:
   displaying a logical trace between a first pin and a second pin.

9. The computer implemented method of claim 7, further comprising:
   displaying a differential pair as a single logical trace.

10. The computer implemented method of claim 1, wherein the fitness is based upon, at least in part, one or more of a neural network, a heatmap, or rectangular uniform wire density ("RUDY").

11. The computer implemented method of claim 1, wherein generating a crossing map includes pre-computing one or more crossings.

12. A computer-readable storage medium having stored thereon instructions for applying genetic optimization to a routing strategy associated with an electronic design, the instructions, when executed by a processor resulting in one or more operations, the operations comprising:
   receiving, using a processor, pin and net information from an electronic design file;
   determining a minimum spanning tree for all pins associated with each of one or more nets;
   identifying one or more pairs of connected pins;
   representing the one or more pairs of connected pins as at least one line segment without layer information;
   generating a crossing map based upon, at least in part, the at least one line segment;
   assigning random layer information to each of the at least one line segment;
   performing crossover and mutation operations to the at least one line segment using one or more hyperparameters;
   evaluating a fitness of the at least one line segment; and
   instantiating one or more vias based upon, at least in part, a layer to which the at least one line segment was assigned.

13. The computer-readable storage medium of claim 12, wherein the fitness is based upon, at least in part, a number of crossings of the at least one line segment.

14. The computer-readable storage medium of claim 12, wherein the fitness is based upon, at least in part, a distribution of crossings of the at least one line segment.

15. The computer-readable storage medium of claim 14, wherein the distribution of crossings is based upon, at least in part, a uniformity metric associated with the distribution of crossings of the at least one line segment.

16. The computer-readable storage medium of claim 15 further comprising:
   selecting one or more best individual line segments from the at least one line segment based upon, at least in part, a tournament-based approach.

17. The computer-readable storage medium of claim 15 further comprising:
   exporting resultant pin and layer data to an electronic design application.

18. The computer-readable storage medium of claim 12, wherein instantiating one or more vias includes instantiating the one or more vias in a position under one or more pins.

19. The computer-readable storage medium of claim 18, further comprising:
   displaying a logical trace between a first pin and a second pin.

20. A system for applying genetic optimization to a routing strategy associated with an electronic design comprising:
   a processor configured to access pin and net information from an electronic design file, the processor further configured to determine a minimum spanning tree for all pins associated with each of one or more nets and to identify one or more pairs of connected pins, the processor further configured to represent the one or more pairs of connected pins as at least one line segment without layer information, the processor further configured to generate a crossing map based upon, at least in part, the at least one line segment and to assign random layer information to each of the at least one line segment, the processor further configured to perform crossover and mutation operations to the at least one line segment using one or more hyperparameters and to evaluate a fitness of the at least one line segment, the processor further configured to instantiate one or more vias based upon, at least in part, a layer to which the at least one line segment was assigned.

* * * * *